United States Patent [19]

Economy et al.

[11] Patent Number: 4,515,828

[45] Date of Patent: May 7, 1985

[54] PLANARIZATION METHOD

[75] Inventors: James Economy; Mary A. Flandera, both of San Jose, Calif.

[73] Assignee: International Business Machines Corporation, Armonk, N.Y.

[21] Appl. No.: 222,195

[22] Filed: Jan. 2, 1981

[51] Int. Cl.$^3$ .............................................. B05D 5/12
[52] U.S. Cl. ..................................... 427/82; 427/129; 427/130; 427/132; 427/240; 427/374.2; 427/379; 427/385.5; 427/386; 427/388.2
[58] Field of Search ................ 427/240, 374.2, 379, 427/386, 385.5, 388.2, 82, 129–132

[56] References Cited

U.S. PATENT DOCUMENTS

| 3,068,119 | 12/1962 | Gotsch | 427/379 |
| 3,243,269 | 3/1966 | Lommel et al. | 427/129 |
| 3,411,941 | 11/1968 | Lowe et al. | 427/379 |
| 3,438,800 | 4/1969 | Johnson | 427/379 |
| 3,666,528 | 5/1972 | Barnhart | 427/240 |
| 4,017,493 | 4/1977 | Ferment | 427/379 |
| 4,258,079 | 3/1981 | Economy et al. | 427/379 |
| 4,287,225 | 9/1981 | Kneller et al. | 427/129 |

FOREIGN PATENT DOCUMENTS

| 197807 | 7/1978 | Japan | 427/240 |
| 5760 | of 1905 | United Kingdom | 427/240 |

*Primary Examiner*—Norman Morgenstern
*Assistant Examiner*—Janyce A. Bell
*Attorney, Agent, or Firm*—Walter J. Madden, Jr.

[57] ABSTRACT

A process for producing an extremely smooth or planarized layer of material employs a polymeric material which, when melted has a viscosity enabling it to flow into all crevices and voids on the treated surface. Subsequent heating cures the polymer to form a planarized layer.

8 Claims, 3 Drawing Figures

TALYSTEP (400Å/div., 4mg probe weight)

Poly (TEB)

Polyimid 5878

H-Resin

PLANARIZATION METHOD

DESCRIPTION

1. Technical Field

The present invention is directed to a method for planarizing or leveling a surface by coating a selected prepolymer compound on the surface, heating the compound to cause it to melt and planarize over the surface, and then further heating the planarized compound to polymerize it to form a tough adherent film.

2. Background Art

There are many applications which require the use of planarization techniques to provide a surface having a minimum surface roughness. Planarization may be defined for purposes of this invention as a treatment which produces a reduction in surface roughness to at least 50% of the original surface roughness and ranging down to completely planar within the limits of detection. To our knowledge, prior art polymer coatings are unable to achieve the degree of planarization provided by the present invention. All of such prior art coatings tend to replicate the surface to which they are applied and hence do not produce a true planarized surface. Such prior art coatings are in fact designed to cure as they enter the melt state, and hence never achieve sufficient flow to achieve planarization.

One application for which the present invention is particularly adapted is the planarization of metal disk substrates to which a magnetic recording material is to be applied to produce a magnetic recording disk. Some of such substrates, usually composed of an aluminum and magnesium alloy, are machined on a diamond turning lathe in an effort to produce an appropriate surface flatness and surface finish. Examination of these machined surfaces shows surprisingly rough surfaces, with many large protrusions, probably resulting from metallurgical defects in the alloy composition. Such protrusions, other irregularities in the substrate surface, and step heights associated with diamond turning, present difficulties when a magnetic coating is applied thereto, such as by spin coating or sputtering, because the applied coating tends to follow or replicate the underlying substrate surface, thus producing a resultant magnetic coating having essentially the same surface irregularities as the substrate itself. These irregularities in the finished magnetic coating are undesirable, not only for present recording disks, but especially for future disks where for improved performance, it is highly desirable that the head "fly" in a stable, more closely spaced relationship with the magnetic surface for recording and reproducing signals therefrom. In this environment, there is a distinct need for a method of applying a coating to the substrate which will flow over and planarize or level the substrate surface to effectively smooth out that surface and provide a very low surface roughness value.

Other areas which would benefit from the planarization technique of this invention include the surface topography of electronic devices, especially those involving multilevel metallurgy. Additionally, in first and second level packaging of semiconductor chips, there is a growing requirement for planarized surface topography.

The present invention involves the application of a prepolymer to the surface to be treated by any suitable technique such as spin coating, spray coating, melt coating, powder coating and the like. Subsequent heating of the prepolyer causes it to melt and flow to form the planarizing layer. Further heat or radiation causes polymerization of the material to form a tough adherent film. The material selected should have the following properties:

1. The prepolymer should be meltable at a reasonable temperature, at or below the cure temperature of the polymer.
2. The prepolymer, when melted, should have a viscosity which will permit the flow required for proper planarization.
3. The prepolymer should remain in the melted phase long enough to allow proper planarization before further polymerization occurs.
4. If the prepolymer material is to be applied from a solution, the following requirements exist:
   (a) The prepolymer should be soluble in a suitable solvent and coatable on the surface to be treated.
   (b) The surface energy of the solution must be sufficient to carry it into all crevices and voids in the treated surface.
5. The surface energy of the prepolymer during the melt processing must be sufficient to produce proper wetting of the treated surface.
6. The polymer must cure to a high molecular weight material.

There are many prepolymer systems which could display the above characteristics for practicing the present invention. Examples of suitable materials for the present invention are: diacetylenic prepolymers including the prepolymer of polytriethynylbenzene (poly TEB); the novolaks which are well known formaldehyde/phenol polymers; and low molecular weight precursors to epoxies and polyimides.

Suitable solvents for the above polymers are diglyme, cellosolve of acetate, ketones and N-methyl-pyrrolidone.

In one embodiment of this invention, continuous planarizing films of diacetylenic polymers are formed by a process which involves applying to a substrate a solution of diacetylenic prepolymer in a reactive solvent system. Preferably, the planarizing film involves a system in which a phenylacetylenic compound is the solvent, as disclosed and claimed in our copending application Ser. No. 103,245, now U.S. Pat. No. 4,258,079, assigned to the same assignee as the present application.

The starting materials for use in that process are diacetylenic prepolymers. Such materials are described in detail in the co-pending application Ser. No. 956,517, now abandoned, assigned to the same assignee as the present application.

DISCLOSURE OF THE INVENTION

The surface to be planarized is coated by an appropriate technique as discussed above with the prepolymers. The coating is then heated to melt the prepolymeric material and cause it to flow, producing a level planarized coating which covers protrusions and other irregularities on the surface without replicating their contour. The film is then crosslinked by the application of further heat or radiation. Crosslinking brings about the polymerization of the prepolymers. After application} and curing of the planarization film, where the planarized surface is a disk substrate, a magnetic recording layer may be applied to the planarized layer, either by spin coating of a liquid particulate coating material or by evaporation or sputtering techniques. As is well known in the art, spin coating involves the application of a liquid coating material to a rotating surface to uniformly distribute the coating material over the surface by centrifugal force.

To illustrate the effectiveness of the planarizing process of the present invention, the following examples are presented:

EXAMPLE 1

Figure 1A:
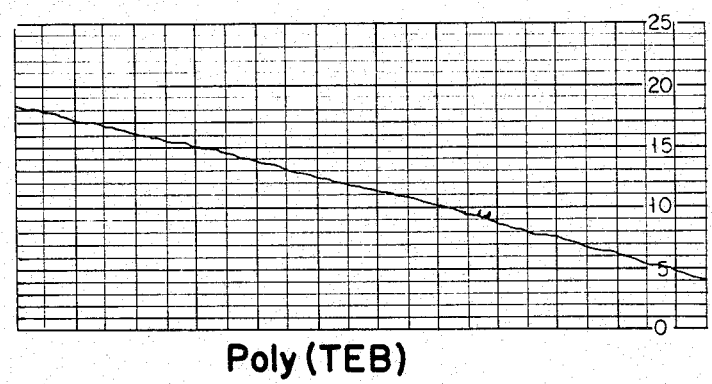
FIGS. 1A–1C are copies of Talystep graphs showing measured surface roughnesses for three different coatings.

A film was prepared by spin-coating a solution of poly (TEB) on a diamond-turned AlMg substrate having an average surface roughness of 3-4 microinches peak-to-valley. The poly (TEB) used was that disclosed in Example 3 of the above-identified application Ser. No. 956,517. The poly (TEB) was in phenylacetylene in a 25% weight by volume (w/v) basis and was coated by spinning the substrate at 2000 rpm for 30 seconds to produce a film having a thickness of 0.4 microns. Examination of this surface at this point by Reflected Light Interference Microscopy (RIMS) showed the typical step heights associated with diamond turning. By subsequently melting and then curing the film on a hot plate, the resulting film planarity was excellent. The planarity of the resulting film was analyzed using a Talystep analyzer (4 milligrams, 400 Å/division) (FIG. 1A) and by Reflected Light Interference Microscopy (RIMS) techniques. The analyzed film showed a surface roughness <250 Å (1 microinch), the limit of resolution of the analyzing instruments. This represents a reduction in surface roughness to <25% of the original value.

To illustrate the superiority of the present planarization technique to those using other polymers, the following experiments were conducted.

EXAMPLE 2

Figure 1B:
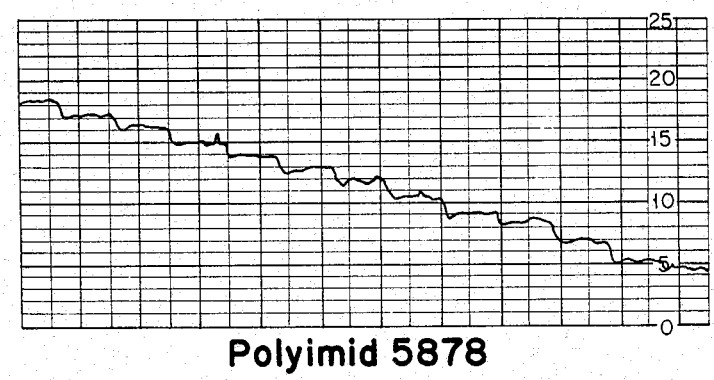

A polyimide identified as 5878 from duPont was supplied mixed with NMP and after dilution, was applied to a substrate as in Example 1 to produce a film of 1 micron thickness. The film was cured and the planarity measured as in Example 1, to indicate a film having a surface roughness of approximately 2 microinches. The Talystep graph for this material is shown in FIG. 1B, showing the replicating of the underlying surface.

EXAMPLE 3

Figure 1C:
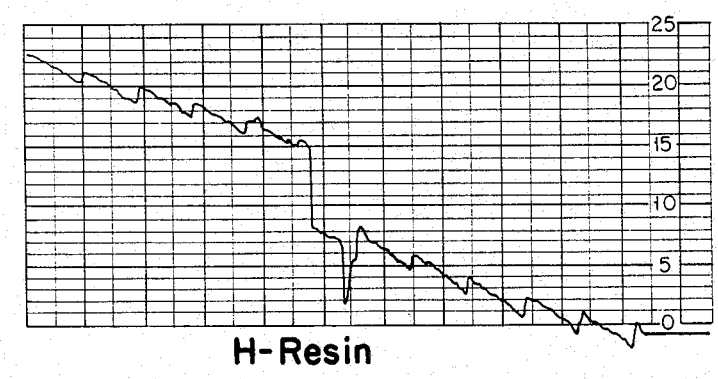

H-resin obtained from Hercules was applied in a 30% w/v solution as in Example 1, to form a 0.5 micron film. The resulting film had a surface roughness of 3 microinches. FIG. 1C illustrates the Talystep graph for this polymer, the right half of the graph showing the roughness of the untreated surface, and the left half showing the roughness of the treated surface. It can be seen from FIG. 1C that the H-resin provided some smoothing, but that this coating clearly tended to replicate the underlying surface.

To ensure a proper comparison of the H-resin, thicker films (1 micron) were prepared (40% w/v in phenylacetylene) and spun at 4000 rpm for 30 seconds. A slight improvement was observed, producing a planarity of 500 Å/division (2 microinches). Since H-resin is composed of a resin and a fluidizer (diphenyldiacetylene), this fluidizer was increased to 45% of the weight and the experiment redone. No further planarization was observed with this adjustment.

EXAMPLE 4

This experiment illustrates the use of novolaks in the present invention.

A 20% w/v solution of novolak was prepared with diglyme solvent and spin-coated on a diamond-turned AlMg disk coupon as in Example 1. The substrate was heated to 85° C. for 30 minutes to remove solvent and then continued heating to 130° C. to obtain the desired melt planarization. To test the degree of planarization, the sample was analyzed by Talystep and shown to possess 1 microinch planarity. The film was then further cured by treating the coating with an acid plus formaldehyde and heating to about 100° for a brief period of time. Alternatively, hexamethylenetetramine can be incorporated in the original solution, heating to temperatures in excess of 100° after melt planarization to achieve curing. In this latter case, lower melting novolaks are preferred, i.e. 70-90° C., to eliminate the possibility of curing during melt reflow.

EXAMPLE 5

To illustrate the use of the present invention for coating ceramic material, the following experiment was performed.

Poly (TEB) in phenylacetylene was applied to a ceramic module 20 microns thick by dipping the substrate in a solution of 30% w/v poly (TEB) in phenylacetylene. The ceramic has a very porous surface with an average roughness of 30,000-40,000 Å, based on Talystep analysis. After coating, the local roughness was removed, with deviations in the surface planarity of 2000-3000 Å. This represents a reduction in surface roughness to approximately 8% of the uncoated value.

EXAMPLE 6

To illustrate the application of the present planarizing technique to metallized ceramic, the following experiment was performed.

Metallized lines deposited on a ceramic substrate 11 microns thick were coated by dipping in a solution of 30% w/v poly (TEB) in 2-ethoxyethyl acetate. The metallized lines were 45,000 Å high and approximately 0.07 mm wide in groups of 5 or more with 0.1 mm spacings. Planarization was achieved to 2000-3000 Å, a reduction to approximately 5% of the original roughness.

Although examples of four types of polymers suitable for the invention have been given, any polymer having the characteristics defined above may be used to achieve highly planarized coatings.

As part of this invention, polymeric additives may be used with the prepolymer within limits to improve the toughness as well as the filming characteristics during coating so long as the additives do not subsequently change the planarization properties of the prepolymer. Such additives should be miscible in the coating solution, but during subsequent processing they may phase separate or still remain miscible with the polymer.

Also included within the scope of this invention are planarized coatings which incorporate fine organic, inorganic or metal particles where the dimensions of the individual particles are significantly smaller than the desired coating thickness. Thus, dispersions of such particles in the prepolymer solution can be coated by standard techniques, and subsequent planarization of the surface achieved by the process described herein. This melt reflow process has the additional advantage of also providing a mechanism for re-wetting the individual particles after evaporation of the solvent to achieve a superior reinforced structure.

We claim:

1. A method of providing a planarized coating on a surface comprising the steps of
    applying a uniform coating of a prepolymer material selected from the group consisting of diacetylenic prepolymers, novolaks, epoxies and polyimides to said surface,
    heating said prepolymer to melt said prepolymer to a low viscosity, maintaining said low viscosity prepolymer in a melted phase for a sufficient length of time to permit said prepolymer to flow to form a planarized layer on said surface, and
    curing said planarized prepolymer into a planarized layer.

2. A method in accordance with claim 1, in which said surface is associated with either first or second level semiconductor packaging.

3. A method in accordance with claim 1, in which said prepolymer is cured by continued heating.

4. A method in accordance with claim 1, in which said prepolymer material is poly triethynylbenzene.

5. A method in accordance with claim 1, in which said prepolymer coating is applied to said surface while said surface is rotating, to uniformly distribute said coating over said surface by centrifugal force.

6. A method in accordance with claim 1, in which said surface is a semiconductor chip.

7. A method in accordance with claim 4, in which said surface is a metallic disk substrate.

8. A method in accordance with claim 5, including the additional step of applying a magnetic recording layer to said planarized layer to produce a magnetic recording disk.

* * * * *